United States Patent [19]

Canevari

[11] 4,316,806

[45] Feb. 23, 1982

[54] METHOD AND DEMULSIFIER COMPOSITION

[75] Inventor: Gerard P. Canevari, Cranford, N.J.

[73] Assignee: Exxon Research & Engineering Co., Florham Park, N.J.

[21] Appl. No.: 189,713

[22] Filed: Sep. 22, 1980

[51] Int. Cl.$^3$ ............................................. B01D 17/04
[52] U.S. Cl. .................................. 210/708; 210/923; 210/925; 252/344; 252/358
[58] Field of Search ............... 210/634, 693, 923, 925, 210/708; 252/358, 344; 134/29; 208/188

[56] References Cited

U.S. PATENT DOCUMENTS

| | | | |
|---|---|---|---|
| 3,597,152 | 8/1971 | Shaw | 252/358 X |
| 3,676,357 | 7/1972 | Ciuti et al. | 210/693 X |
| 3,756,959 | 9/1973 | Vitalis et al. | 252/358 X |
| 3,936,317 | 2/1976 | Lehmann | 134/29 |
| 4,089,803 | 5/1978 | Bessler | 252/344 |

Primary Examiner—Frank A. Spear, Jr.
Attorney, Agent, or Firm—Robert S. Salzman

[57] ABSTRACT

A demulsifier and method for use in oil-spill recovery and clean-up that rapidly and efficiently separates a water/crude oil emulsion into its water and crude oil phases. The demulsifier comprises various mixtures of two components A and B. A is comprised of at least one wetting agent formulated to displace one liquid from the surface of a bi-wetted solid disposed at a boundary of a water droplet and oil phase continuum with another liquid via a reduction of the liquid-solid interfacial tension; and B is comprised of at least one surfactant effective in displacing an indigenous emulsifying surfactant film by another surfactant that permits water droplet coalescence and separation from said oil phase continuum.

48 Claims, 13 Drawing Figures

METHOD AND DEMULSIFIER COMPOSITION

FIELD OF THE INVENTION

The invention pertains to a demulsifier for separating a water/crude oil emulsion into its water and crude oil phases for use in oil spill recovery and clean-up, and more particularly to an improved demulsifier composition which demulsifies the water/crude oil emulsion in a rapid and efficient manner while eliminating, or at least reducing, oil residuums in the water phase.

BACKGROUND OF THE INVENTION

Oil spill recovery and clean-up presents many major problems. A substantial portion of crude oils that are spilled on the sea readily form water-in-oil emulsions due to the mixing energy supplied by the wave action of the sea, and the presence of surfactants and bi-wettable particulates naturally present in the crude. These surfactants and particulates prevent coalescence of the water droplets trapped in the oil, such that a particularly sticky and viscous emulsion is formed which is considerably more difficult to handle than plain crude oil. This emulsion may contain as much trapped water as four times the oil, severly straining clean-up and storage facilities at sea.

Clean-up and storage facilities at sea are typically barges and floating dracones, which are large, sausage-shaped rubber containers. The cost of storing recovered crude on these on-scene storage facilities is presently approximately $100/bbl. Obviously, an emulsion containing as much as 80% water would be very wasteful of storage space and money, and would make recovery of the crude oil impractical.

In an attempt to resolve this problem, various demulsifiers have been injected into the water/crude oil emulsion to separate out the water prior to storage at sea.

Unfortunately, presently available demulsifiers have many shortcomings and disadvantages, to wit: (a) Removal of the water from the water/crude oil emulsion is not always complete, leaving the problem of environmentally disposing of oil-containing water residues at sea; (b) many demulsifiers are toxic to the environment, traces of which are left behind in the discarded water residues; (c) many demulsifiers require huge amounts of mixing energy, and take a long time to accomplish the separation of the water from the crude; and (d) most demulsifiers are effective with only selective types of crude oils, and may not be effective in every case or situation.

The present invention seeks to provide a demulsifier which will eliminate or resolve most, if not all, of the aforementioned disadvantages of these prior demulsifiers, and which will further provide many new and useful advantages, as will be explained hereinafter.

In addition, it is believed that this is the first time any one has composed a demulsifier for water/crude oil emulsions comprising a mixture of (1) at least one wetting agent formulated to displace one liquid from the surface of a bi-wetted solid disposed at a boundary of a water droplet and oil phase continuum with another liquid via a reduction of the liquid-solid interfacial tension, and (2) at least one surfactant effective in displacing an indigenous emulsifying surfactant film and which permits aqueous droplet coalescence and separation from the oil phase continuum.

It is also believed that this is the first time anyone has demulsified a water/crude oil emulsion by the method of: (a) displacing one liquid from a surface of a bi-wetted solid disposed at a boundary of a water droplet and oil phase continuum with another liquid via reduction of liquid-solid interfacial tension at said boundary, and (b) displacing an indigenous crude oil surfactant film by another surfactant that permits water droplet coalescence and separation from said oil phase continuum.

BRIEF SUMMARY OF THE INVENTION

This invention relates to a method of demulsifying and a demulsifier composition having the general formula by volume:

$$A_xB$$

wherein A is a mixture of wetting agents formulated to displace one liquid from the surface of a bi-wetted solid disposed at a boundary of a water droplet and oil phase continuum with another liquid via a reduction of the liquid-solid interfacial tension, and further wherein A comprises at least 90% by weight of a mixture of alkyl sulfosuccinates and ethoxylated alkyl phenol in a solvent;

wherein B is a mixture of surfactants effective in displacing an indigenous emulsifying surfactant film by another surfactant that permits water droplet coalescence and separation from the oil phase continuum, and further wherein B comprises at least 50% by weight of a mixture of oxyalkylated nonylphenolic resin and a glycol ester in an aromatic hydrocarbon solvent; and wherein x has a range of approximate values from 19 to 3 and from 0.3 to 0.1.

More particularly, the invention pertains to a demulsifier mixture for separating a water/crude oil emulsion into its water and crude oil phases having a composition of the general formula by volume:

$$A_xB$$

wherein A is a mixture of sodium dioctyl sulfosuccinate, sodium dihexyl sulfosuccinate and an ethoxylated alkyl phenol of the general formula:

wherein y is 9 or 10, in a solvent, in a weight ratio of approximately 6 to 3 to 1 to 1.

wherein B is a mixture of oxyalkylated P-nonyl phenol resin and polypropylene glycol adipate in an aromatic hydrocarbon solvent in a weight ratio of approximately 7 to 1 to 5; and wherein x is in a range of values from approximately 19 to 3 and from approximately 0.3 to 0.1.

The preferred range of values for x is approximately from 19 to 3, and the preferred value for x is approximately 9.

The solvent for component A is preferably approximately 5% to 15% by weight isopropanol, and the preferred solvent for B is a mixture of approximately 30% to 45% by weight of approximately equal weights of heavy aromatic naphtha and xylene.

The mixture of wetting agents of A may approximately have the following weight ranges:

sodium dioctyl sulfosuccinate, 45% to 65%;
sodium dihexyl sulfosuccinate, 20% to 40%; and
ethoxylated alkyl phenol, 0% to 20%.

The mixture of B may comprise approximately 5% to 15% by weight polypropylene glycol adipate and approximately 40% to 60% by weight oxyalkylated P-nonyl phenol resin.

The demulsifier of this invention has as one of its objectives to separate water/crude oil emulsion into its oil and water phases in a matter of minutes and with a minimum of mixing energy.

Another objective of the inventive demulsifier is to substantially completely separate the water/crude oil emulsion into its oil and water phases, such that there are no oily residues in the separated water phase.

Still another object of this invention is to provide a demulsifier which can be used in small amounts and which will give consistently effective results with a wide range or selection of crudes.

These and other objects of the invention will be better understood and will become more apparent with reference to the following detailed description which is to be considered in conjunction with the accompanying drawings described below.

DETAILED DESCRIPTION OF THE INVENTION

Generally speaking, the invention concerns oil spill recovery and clean-up. The tendency for oil spills to form stable water-in-oil emulsions is well documented. The mechanisms responsible for the formation of these water-in-oil emulsions has been only recently understood. Briefly, there are two modes of emulsion stabilization. These two modes of stabilization will be briefly discussed with reference to FIGS. 1-3.

Figure 1:
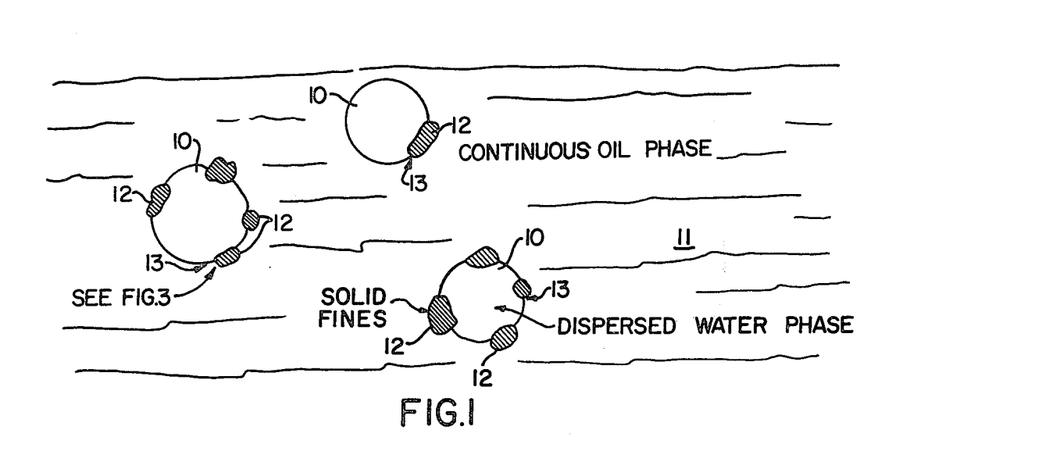
FIG. 1 shows in schematic view, a cross-section of a typical crude oil/water emulsion.

FIG. 1 depicts a water-in-oil emulsion wherein droplets 10 are dispersed throughout an oil phase 11. The water droplets 10 are associated with bi-wetted solids 12 disposed at the oil-water interface 13. These solids 12 can be particles of silt, sand or other partly water wetted and partly oil wetted particles present in the crude itself or found in the sea water. These particles act as a physical barrier between adjoining water droplets, thus preventing water droplet coalescence. As shown in the enlarged view of FIG. 3, the contact angle $\theta$ is greater than 90°, thus indicating that the solid particle is preferentially wetted by the oil phase 11. This oil phase preference satisfies one of the requirements for a stable water-in-oil emulsion.

Figure 3:
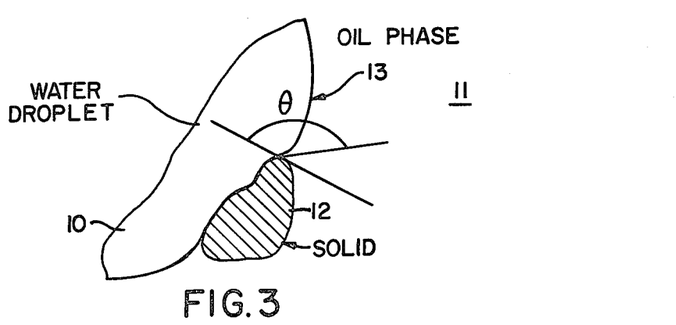
FIG. 3 is an enlarged schematic view of a portion of a water droplet depicted in the emulsion shown in FIG. 1.

In order to obtain droplet coalescence, one of the characteristics of a demulsifier should be the ability to modify this angle, i.e. $\theta = 0°$ for completely water wetted or $\theta = 180°$ for completely oil wetted. Thus, the particle will reside completely in the water or oil phase and be removed from the interface. This can be accomplished by utilizing proper wetting agents or mixtures thereof.

The other mode of emulsion stabilization is a result of naturally occurring surface active agents present in the crude oil, which agents are very effective in preventing coalescence of the water droplets. These surface active agents or surfactants 14 shown in FIG. 2, form a plastic-like film at the water-oil interface 15 of the water droplet 10. This film is formed as these surfactants align or otherwise orient themselves according to their water soluble and oil soluble molecular portions, as shown. These surfactants 14 form a tightly packed configuration about the water droplet 10 due to their dichotomous molecular preferences. Thus, a coalescence barrier is created which stabilizes the emulsion.

Figure 2:
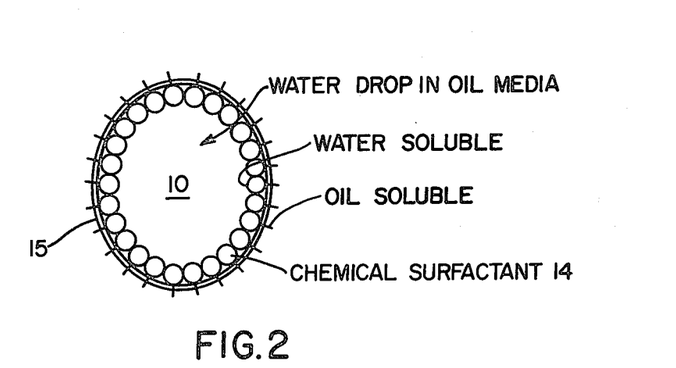
FIG. 2 is a schematic cross-sectional view of a typical water droplet disposed in the emulsion illustrated in FIG. 1.

A good demulsifier should be able to displace these surfactants 14 by other surfactants which reduce the interfacial tension, and breaks down the coalescence barrier.

The demulsifier mixture of this invention (hereinafter designated demulsifier BR is comprised of two components: a mixture of wetting agents A and a mixture of chemical film destabilizers B in a preferred volume ratio of 9 parts A to 1 part B, as typically set forth below:

| DEMULSIFIER BR | | |
|---|---|---|
| 9 Parts "A" (Volume) | Sodium dioctyl sulfosuccinate | 54.0 wt. % |
| | Sodium dihexyl sulfosuccinate | 28.0 wt. % |
| | $C_8H_{17}\!-\!\!\bigcirc\!\!-\!(OCH_2CH_2)_y OH$ y equals 9 or 10. | 9.0 wt. % |
| | Isopropanol | 9.0 wt. % |
| | | 100.0 wt. % |
| 1 Part "B" (Volume) | Heavy Aromatic Naphtha | 19.0 wt. % |
| | Xylene | 17.5 wt. % |
| | Isopropanol | 1.6 wt. % |
| | Oxyalkylated P-nonyl Phenol Resin | 50.4 wt. % |
| | Polypropylene Glycol Adipate | 7.2 wt. % |
| Impurities | Sodium Dodecyl Benzene Sulfonate | 2.2 wt. % |
| | Naphthenic Acid | 1.6 wt. % |
| | Dodecyl Benzene Sulfonic Acid | .3 wt. % |
| | Water | .2 wt. % |
| | | 100.0 wt. % |

The inventive demulsifier composition (designated BR) was utilized against various emulsions of 50% water and 50% Kuwait, Light Arabian, and LaRosa crude oils, respectively, to observe its ability to remove water from these crudes. Similar tests were conducted with other commercially available demulsifiers. Comparison of the ability of these various demulsifiers and the inventive demulsifier BR to remove water from these different emulsions under different test conditions is illustrated in FIGS. 4 through 10. The comparative results and the various test procedures are set forth below in the following examples I through VII:

EXAMPLE I

Samples of commercially available demulsifiers such as Aerosol OT were obtained from American Cyanamid Co., Linden, N.J., and UNISPERSE M-74 was obtained from Universal-Matthey Products SA., Paris, France. Exxon Chemical Company's (Houston, Tex.) BREAXIT 111 and 125, respectively, were also used in the tests along with the inventive demulsifier BR.

Figure 4:
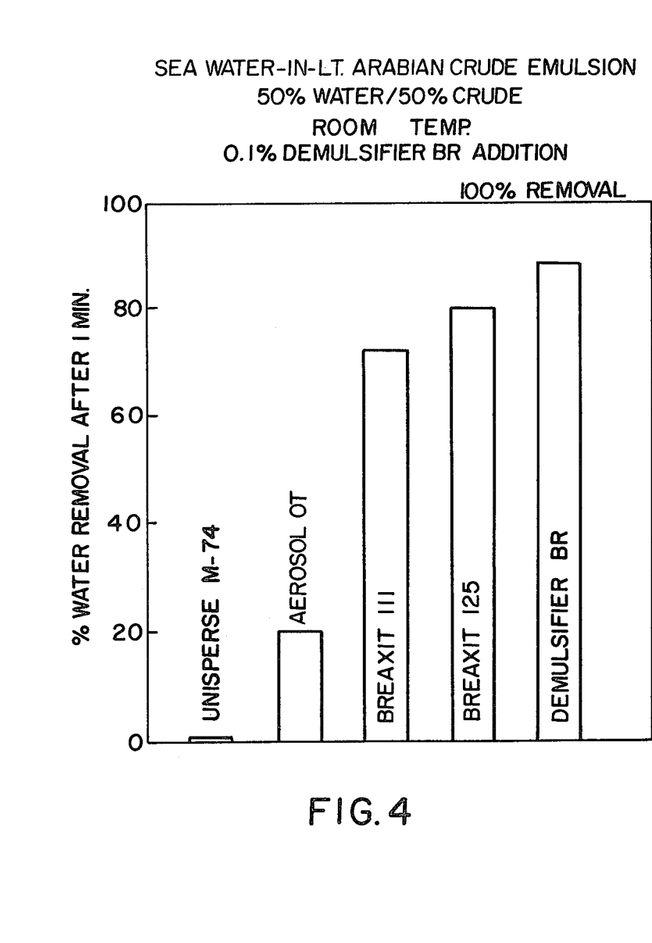
FIGS. 4 through 10 depict graphical views of comparisons of the water removal effectiveness of the demulsifier of this invention with respect to other commercially available demulsifiers for various emulsions and emulsion conditions.

A stable emulsion of 50% sea water in 50% Lt. Arabian Crude was made by adding the water slowly to the system in a Waring Blender. The test demulsifier BR was added at 0.1% concentration to a 50 ml graduate of the viscous emulsion. The chemical was then mixed for 1 minute by controlled shaking which was felt to represent a low level of mixing energy. FIG. 4 presents the comparative test results of the above-noted chemical demulsifiers at room temperature. The almost instantaneous water separation (after one minute) of demulsifier BR, BREAXIT 111 and 125 at room temperature can readily be seen. The poor performance of Unisperse M-74 and Aersol OT, may be due to the relatively lower level of mixing provided for this test than other similar tests.

EXAMPLE II

Figure 5:
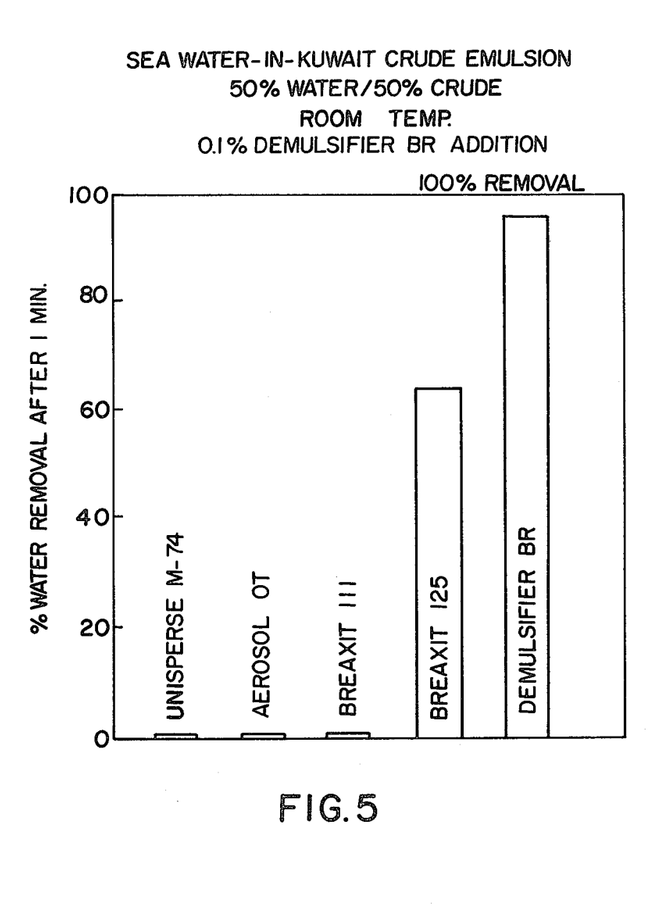

The same test as set forth above in Example I was conducted for an emulsion of 50% water and 50% Kuwait Crude. The test results of this test are shown in FIG. 5.

Kuwait Crude was used for the emulsion system which is known to form a more stable emulsion than that of Lt. Arabian Crude. Note the poorer performance of Aerosol OT and BREAXIT 111.

EXAMPLE III

Figure 6:
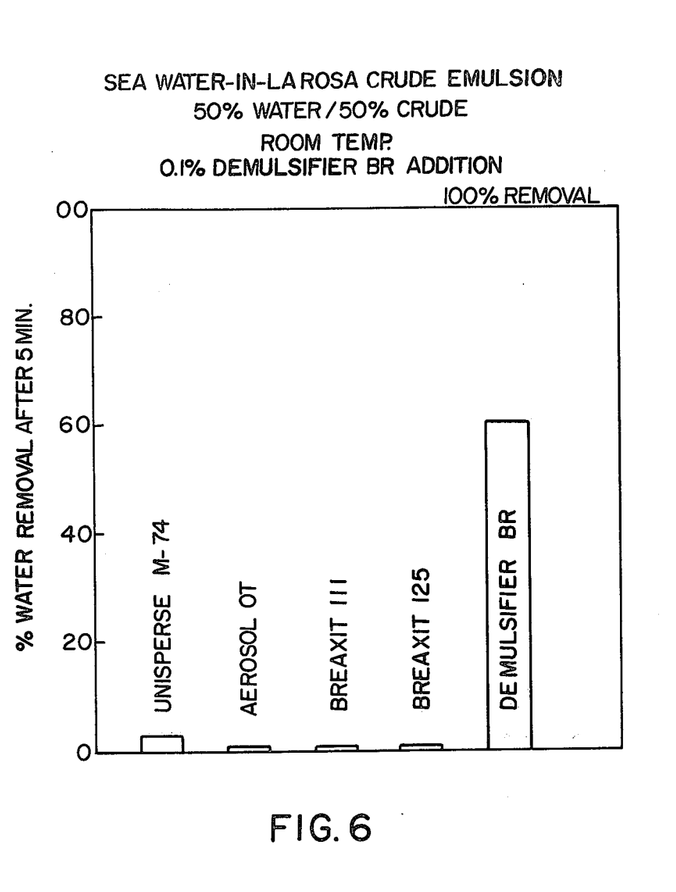

The same test as set forth above in Example I was conducted for an emulsion of 50% water and 50% LaRosa Crude. The test results are shown in FIG. 6. LaRosa Crude forms a very stable emulsion and is a heavy, viscous crude (24° API). The poorer performance of all systems relative to Lt. Arabian Crude (FIG. 4) can be seen.

EXAMPLE IV

Figure 7:
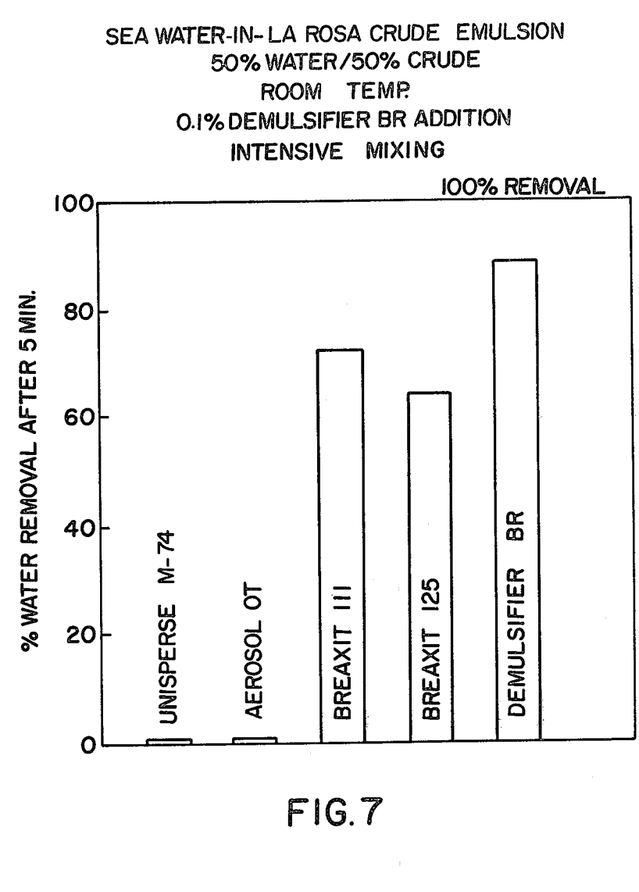

Tests with LaRosa Crude were repeated but with more intensive mechanical mixing. The improved performance as shown in FIG. 7 of demulsifier BR and BREAXIT 111 and 125 compared to the results shown in FIG. 6 support the postulation that mixing is a factor that influences the performance of a demulsifier.

EXAMPLE V

Figure 8:
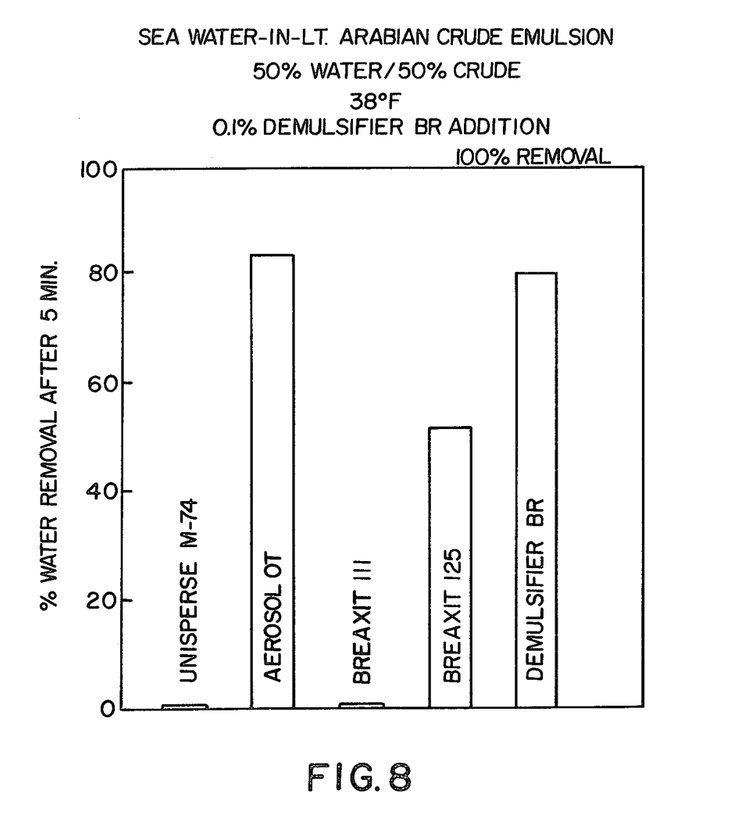

Tests with Lt. Arabian Crude were repeated at 38° F. rather than room temperature (FIG. 4). Test results are shown in FIG. 8. The improved performance of Aerosol OT was not expected.

EXAMPLE VI

Figure 9:
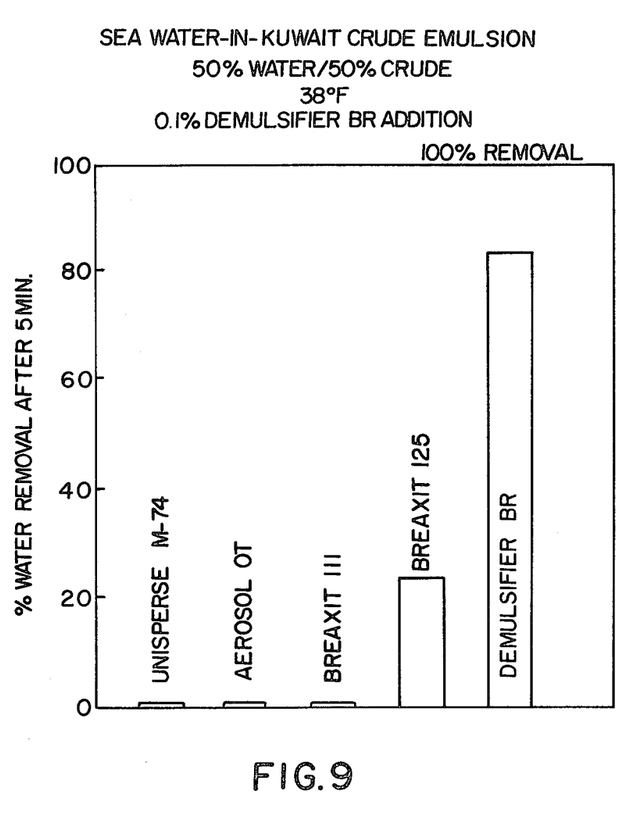

Tests with Kuwait Crude were repeated at 38° F. rather than room temperature (FIG. 6). Test results are shown in FIG. 9. This is perhaps the most difficult system tested. The water separated is plotted after 30 minutes rather than 1 minute or 5 minutes. The improved performance of BREAXIT 111 for this system and BREAXIT 125 for the previous Kuwait emulsion indicate the specificity of demulsifiers for various crude oil emulsions. Also, it was not expected that BREAXIT 111 would perform better at 38° F. than room temperature (FIG. 6).

EXAMPLE VII

Figure 10:
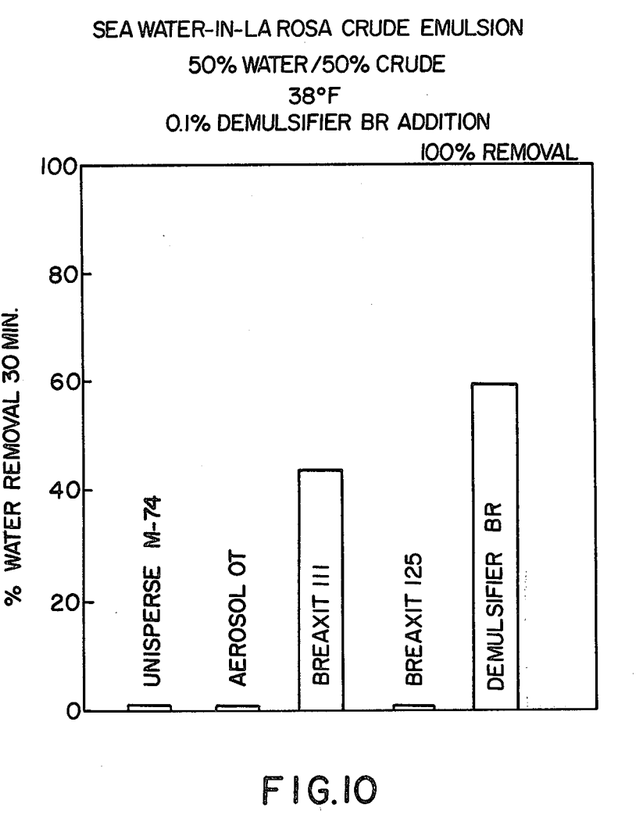

FIG. 10 illustrates the results of utilizing the LaRosa Crude emulsion at 38° F. The only demulsifiers that gave good results were the BREAXIT 111 and the inventive demulsifier BR.

A review of the tests results presented in FIGS. 4 through 10 indicates that only demulsifier BR gave consistently good performance under all conditions and different types of crude oil emulsion.

EXAMPLE VIII

Figure 12:
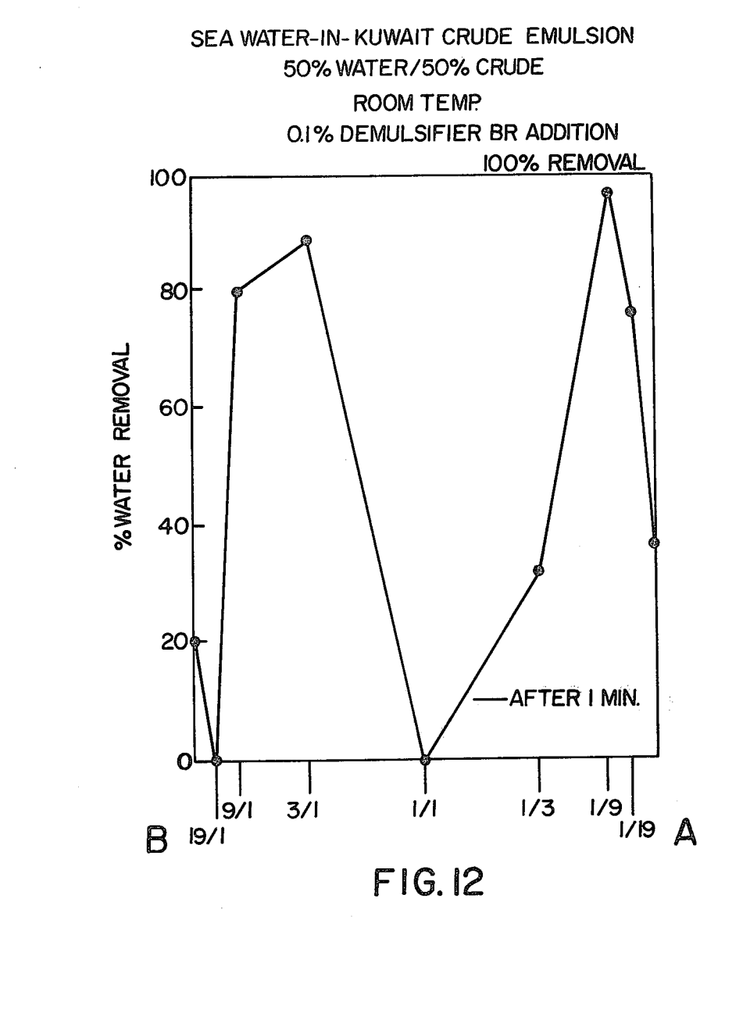
FIGS. 12 and 13 are graphs showing the effectiveness of water removal for two types of emulsions and for various demulsifier compositions in accordance with the invention.

The test procedure of Example I was repeated for different compositions of demulsifier BR by changing the volume ratios of components A and B of the demulsifier. Again, an emulsion of 50% water and 50% Lt. Arabian Crude was tested at room temperature with 0.1% demulsifier solutions added and mixed for one minute. The results of these tests are shown in FIG. 12. As can be seen from this graph, the volume ratios of A to B in the range of 19 to 3 and 0.3 to 0.1 gave acceptable results. The ratio of A to B of 9 to 1 provided one of the highest percentage of water removal.

EXAMPLE IX

Figure 13:
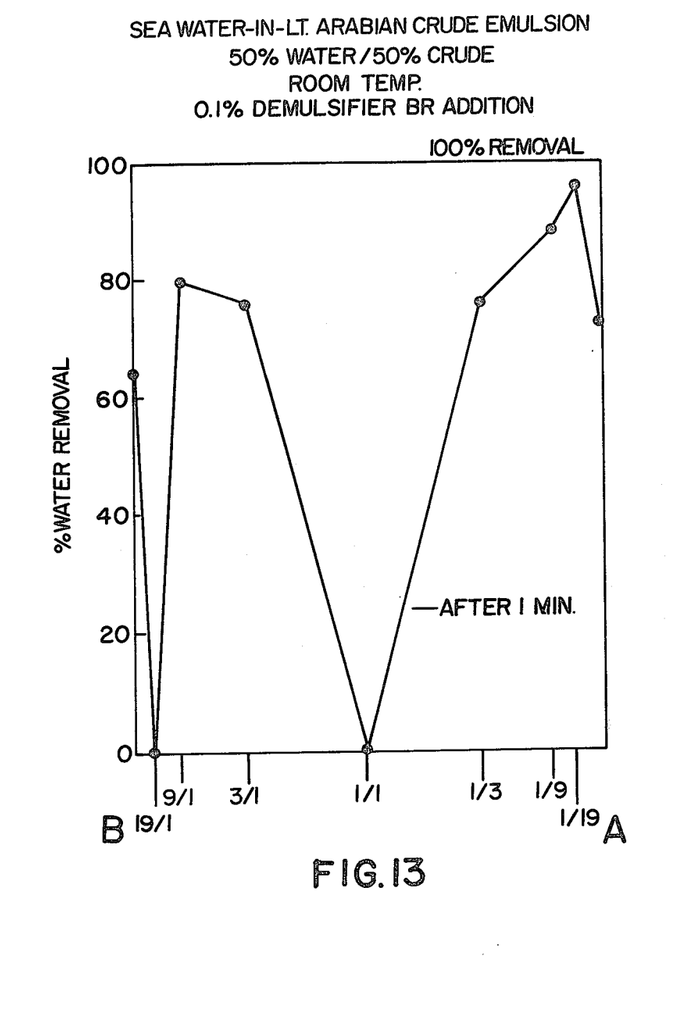

The test procedure of Example II was repeated for different compositions of demulsifier BR by changing the volume ratios of compositions A and B of the demulsifier. An emulsion of 50% water and 50% Kuwait Crude was tested at room temperature with 0.1% demulsifier solutions added and mixed for one minute. The results of these tests are shown in FIG. 13. As observed from the graph, the volume ratios of A to B in the range of 19 to 3 and 0.3 to 0.1 gave acceptable results, with the ratio of 9 to 1 providing the highest percentage of water removal.

EXAMPLE X

The test procedure of Example II was repeated for different compositions of demulsifier BR by changing the various weight percentages of wetting agents of component A. The various compositions of component A, now designated $A_0$; $A_1$; $A_2$; $A_3$; etc. in Table I below, were mixed with component B in a 9 to 1 volume ratio. A 0.1% solution (by volume) of each modified demulsifier was mixed for 2 minutes with 50 milliliters of a sea water-in-Kuwait Crude oil emulsion. The ability of these different compositions to remove water from the emulsion is tabulated in Table I below: (Removal of 20 milliliters of water represents 100% removal).

TABLE I

| | Original Composition Of Component A | Modified Compositions of A | | | | | |
|---|---|---|---|---|---|---|---|
| | $A_o$ | $A_1$ | $A_2$ | $A_3$ | $A_4$ | $A_5$ | $A_6$ |
| Sodium dioctyl sulfosuccinate | 54 | 46 | 26 | 21 | | 74 | 60 |

TABLE I-continued

| | Original Composition Of Component A | Modified Compositions of A | | | | | |
|---|---|---|---|---|---|---|---|
| | $A_o$ | $A_1$ | $A_2$ | $A_3$ | $A_4$ | $A_5$ | $A_6$ |
| Sodium dihexyl sulfosuccinate | 28 | 38 | 56 | 22 | 60 | | 30 |
| $C_8H_{17}\!-\!\!\langle\ \rangle\!\!-\!(OCH_2CH_2)_yOH$ y = 9 or 10 | 9 | 7 | 9 | 34 | 20 | 13 | |
| Isopropanol | 9 | 7 | 9 | 23 | 20 | 13 | 10 |
| Water separation after 2 minutes (water removal in milliliters) | 19 | 14 | 3 | 0 | 0 | 18 | 16 |
| Appearance of separated water | very clear | oily | oily | — | — | oily | oily |

Of all the various compositions listed in Table I above, only the original formulation $A_0$ for component A gave a clear water phase upon separation. All the other modified compositions of component A left an oily separated water phase. The purity of the separated water was measured on a Hach Chemical Company Turbitity meter. The light transmittance of original component A (designated $A_0$) was 100%, while the separated water using component $A_1$ was 92%. Only components $A_0$; $A_1$; $A_5$; and $A_6$ gave acceptable water separation performances.

Figure 11:
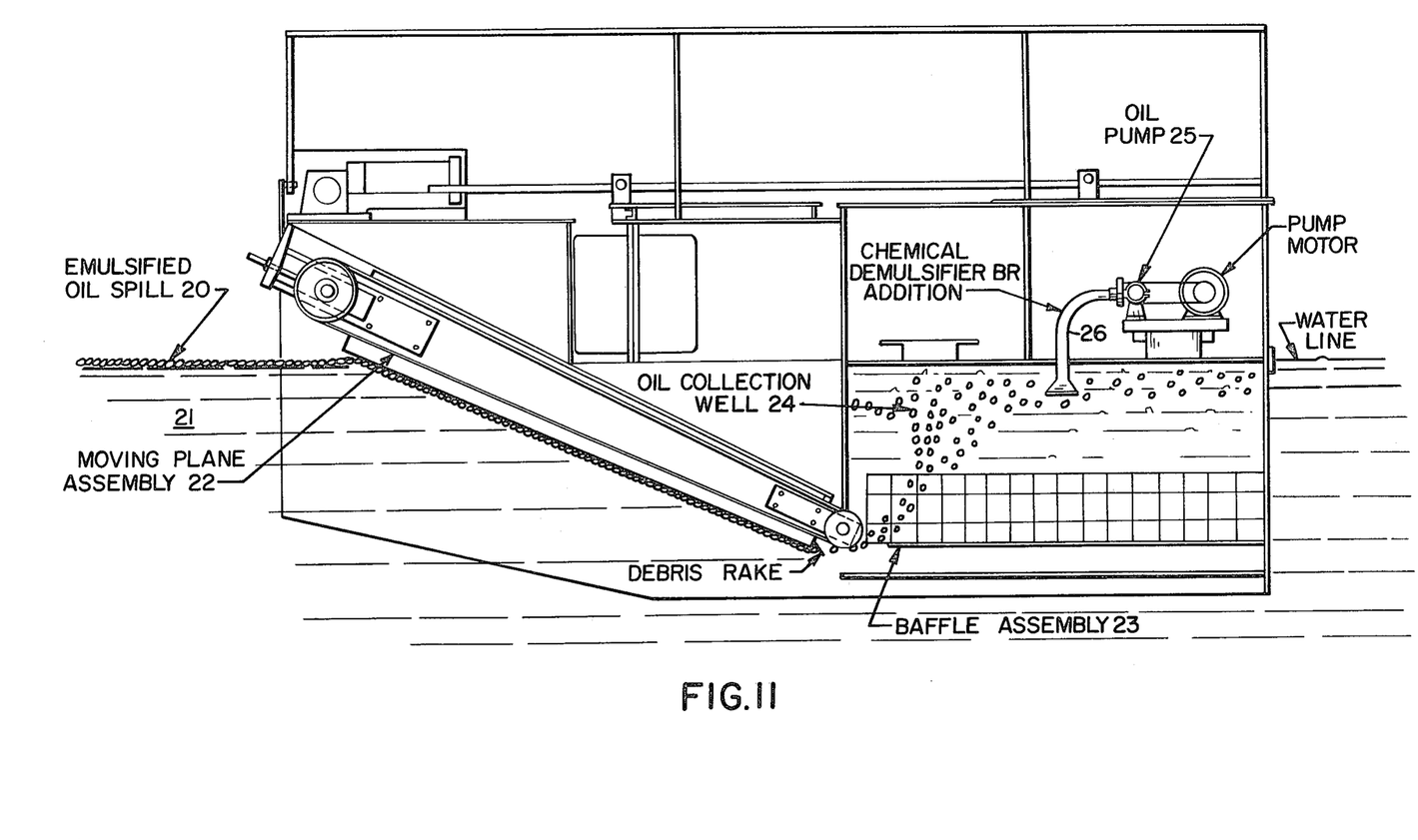
FIG. 11 depicts a schematic side view of a typical oil recovery apparatus.

The demulsifier BR has shown that it can effectively separate various water-in-oil emulsions with a minimum of mixing energy and with a minimum amount of demulsifier being added (0.03 to 0.1%) to the emulsion. A full-scale field test using demulsifier BR and the oil recovery apparatus shown in FIG. 11, was successful. The apparatus of FIG. 11 is a JBF Skimmer manufactured by JBF Scientific Corp., Wilmington, Mass. This apparatus uses a Moyno-type pump 25, which imparts minimum agitation (mixing) in pumping the emulsion. Therefore, the field test confirmed the ability of the demulsifier BR to separate the emulsion with a minimum of mixing energy.

The emulsified oil spill 20, was gathered from the water 21 by the moving plane assembly 22. The baffle assembly 23 directed the emulsion into the oil collection well 24. The chemical demulsifier BR of this invention was added to the suction intake pipe 26 of the oil pump 25, as the emulsion was removed from well 24. The demulsifier BR was added in a volume amount of 0.03% to 0.04%. Substantially complete separation was achieved in approximately four (4) minutes.

Having thus described the invention, what is desired to be protected by Letters Patent is presented by the following appended claims.

What we claim is:

1. A demulsifier mixture having the general formula by volume:

$A_xB$ wherein A is a mixture of wetting agents formulated to displace one liquid from the surface of a bi-wetted solid disposed at a boundary of a water droplet and oil phase continuum with another liquid via a reduction of the liquid-solid interfacial tension, and further wherein A comprises at least 90% by weight of a mixture of alkyl sulfosuccinates and ethoxylated alkyl phenol in a solvent;

wherein B is a mixture of surfactants effective in displacing an indigenous emulsifying surfactant film by another surfactant that permits water droplet coalescence and separation from said oil phase continuum, and further wherein B comprises at least 50% by weight of a mixture of oxyalkylated nonylphenolic resin and a glycol ester in an aromatic hydrocarbon solvent; and wherein x has a range of approximate values from 19 to 3 and from 0.3 to 0.1.

2. The demulsifier mixture of claim 1, wherein the preferred value for x is approximately in the range from 19 to 3.

3. The demulsifier mixture of claim 1 wherein the preferred value for x is approximately 9.

4. The demulsifier mixture of claim 1 wherein the mixture of A comprises approximately 45% to 65% by weight sodium dioctyl sulfosuccinate.

5. The demulsifier mixture of claim 1 wherein the mixture of A comprises approximately 20% to 40% by weight sodium dihexyl sulfosuccinate.

6. The demulsifier mixture of claim 1 wherein the mixture of A comprises approximately 0% to 20% by weight of an ethoxylated alkyl phenol of the general formula:

wherein y is either 9 or 10.

7. The demulsifier mixture of claim 1 wherein A comprises a mixture of sodium dioctyl sulfosuccinate, sodium dihexyl sulfosuccinate, and an ethoxylated alkyl phenol in an approximate ratio by weight of 6 to 3 to 1.

8. The demulsifier mixture of claim 7 wherein the mixture of A is in a solvent comprising isopropanol.

9. The demulsifier mixture of claim 8 wherein said isopropanol is approximately 5% to 15% by weight of the total composition of A.

10. The demulsifier mixture of claim 1 wherein the mixture of A is in a solvent comprising isopropanol.

11. The demulsifier mixture of claim 1 wherein the mixture of B comprises an oxyalkylated P-nonyl phenol resin.

12. The demulsifier mixture of claim 1 wherein the mixture of B comprises polypropylene glycol adipate.

13. The demulsifier mixture of claim 1 wherein the mixture of B is in a solvent comprising heavy aromatic naphtha.

14. The demulsifier mixture of claim 1 wherein the mixture of B is in a solvent comprising xylene.

15. The demulsifier mixture of claim 1 wherein the mixture of B is in a solvent comprising 30% to 45% by weight of a mixture of approximately equal weights of heavy aromatic naphtha and xylene.

16. The demulsifier mixture of claim 1 wherein the mixture of B comprises approximately 40% to 60% by weight oxylated P-nonyl phenol resin.

17. The demulsifier mixture of claim 1 wherein the mixture of B comprises approximately 5% to 15% by weight polypropylene glycol adipate.

18. The demulsifier mixture of claim 1 wherein the mixture of B comprises oxyalkylated P-nonyl phenol resin and polypropylene glycol adipate in an approximate ratio by weight of 7 to 1.

19. The demulsifier mixture of claim 1 wherein the mixture of A comprises sodium dioctyl sulfosuccinate.

20. The demulsifier mixture of claim 1 wherein the mixture of A comprises sodium dihexyl sulfosuccinate.

21. The demulsifier mixture of claim 1 wherein the mixture of A comprises an ethoxylated alkyl phenol of the general formula:

wherein y is either 9 or 10.

22. A demulsifier mixture having the general formula by volume:

$A_xB$ wherein A is a mixture of wetting agents comprising at least 90% by weight of a mixture of alkyl sulfosuccinates and ethoxylated alkyl phenol in a solvent;

wherein B is a mixture of surfactants comprising at least 50% by weight of a mixture of oxyalkylated nonylphenolic resin and a glycol ester in an aromatic hydrocarbon solvent; and wherein x has a range of approximate values from 19 to 3 and from 0.3 to 0.1.

23. The demulsifier mixture of claim 22 wherein the preferred value for x is approximately in the range from 19 to 3.

24. The demulsifier mixture of claim 22 wherein the preferred value for x is approximately 9.

25. The demulsifier mixture of claim 22 wherein the mixture of A comprises approximately 45% to 65% by weight sodium dioctyl sulfosuccinate.

26. The demulsifier mixture of claim 22 wherein the mixture of A comprises approximately 20% to 40% by weight sodium dihexyl sulfosuccinate.

27. The demulsifier mixture of claim 22 wherein the mixture of A comprises approximately 0% to 20% by weight and ethoxylated alkyl phenol of the general formula:

wherein y is either 9 or 10.

28. The demulsifier mixture of claim 22 wherein A comprises a mixture of sodium dioctyl sulfosuccinate, sodium dihexyl sulfosuccinate, and an ethoxylated alkyl phenol in an approximate ratio by weight of 6 to 3 to 1.

29. The demulsifier mixture of claim 28 wherein the mixture of A is in a solvent comprising isopropanol.

30. The demulsifier mixture of claim 29 wherein said isopropanol is approximately 5% to 15% by weight of the total composition of A.

31. The demulsifier mixture of claim 22 wherein the mixture of A is in a solvent comprising isopropanol.

32. The demulsifier mixture of claim 22 wherein the mixture of B comprises an oxyalkylated P-nonyl phenol resin.

33. The demulsifier mixture of claim 22 wherein the mixture of B comprises polypropylene glycol adipate.

34. The demulsifier mixture of claim 22 wherein the mixture of B is in a solvent comprising heavy aromatic naphtha.

35. The demulsifier mixture of claim 22 wherein the mixture of B is in a solvent comprising xylene.

36. The demulsifier mixture of claim 22 wherein the mixture of B is in a solvent comprising 30% to 45% by weight of a mixture of approximately equal weights of heavy aromatic naphtha and xylene.

37. The demulsifier mixture of claim 22 wherein the mixture of B comprises approximately 40% to 60% by weight oxyalated P-nonyl phenol resin.

38. The demulsifier mixture of claim 22 wherein the mixture of B comprises approximately 5% to 15% by weight polypropylene glycol adipate.

39. The demulsifier mixture of claim 22 wherein the mixture of B comprises oxyalkylated P-nonyl phenol resin and polypropylene glycol adipate in an approximate ratio by weight of 7 to 1.

40. The demulsifier mixture of claim 22 wherein the mixture of A comprises sodium dioctyl sulfosuccinate.

41. The demulsifier mixture of claim 22 wherein the mixture of A comprises sodium dihexyl sulfosuccinate.

42. The demulsifier mixture of claim 22 wherein the mixture of A comprises an ethoxylated alkyl phenol of the general formula:

wherein y is either 9 or 10.

43. A demulsifier mixture for separating a water/crude oil emulsion into its water and crude oil phases having a composition of the general formula by volume:

$A_xB$ wherein A is a mixture of sodium dioctyl sulfosuccinate, sodium dihexyl sulfosuccinate and an ethoxylated alkyl phenol of general formula:

wherein y is 9 or 10, in a solvent, in a weight ratio of approximately 6 to 3 to 1 to 1;

wherein B is a mixture of oxalkylated P-nonyl phenol resin and polypropylene glycol adipate in an aromatic hydrocarbon solvent in a weight ratio of approximately 7 to 1 to 5; and wherein x is in a range of values from approximately 19 to 3 and from approximately 0.3 to 0.1.

44. The demulsifier mixture of claim 43, wherein x is preferably in the range of approximately 19 to 3.

45. The demulsifier mixture of claim 43, wherein the preferred value of x is approximately 9.

46. The demulsifier mixture of claim 43, further comprising isopropanol as a solvent for component A.

47. The demulsifier mixture of claim 43, further comprising a mixture of heavy aromatic naphtha and xylene as a solvent for component B.

48. A method of demulsifying a water/crude oil emulsion, comprising the steps of:

(a) displacing one liquid from a surface of a bi-wetted solid disposed at a boundary of a water droplet and oil phase continuum with another liquid via reduction of liquid-solid interfacial tension at said boundary, and (b) displacing an indigenous crude oil surfactant film by another surfactant that permits water droplet coalescence and separation from said oil phase continuum.

* * * * *